United States Patent [19]
Frame et al.

[11] Patent Number: 5,251,572
[45] Date of Patent: Oct. 12, 1993

[54] ANIMAL TRANSPORT-TRANSFER CAGE SYSTEM

[76] Inventors: William A. Frame, 1119 Haverford Rd., Ridley Park, Pa. 19078; Julian T. Canuso, Jr., 1704 Bayshore Ave., Brigantine, N.J. 08203

[21] Appl. No.: 891,575

[22] Filed: Jun. 1, 1992

[51] Int. Cl.⁵ .............................................. A01K 1/00
[52] U.S. Cl. ......................................... 119/17; 119/15
[58] Field of Search .................... 119/15, 17, 19, 45.1, 119/165

[56] References Cited

U.S. PATENT DOCUMENTS

| | | | |
|---|---|---|---|
| 459,216 | 9/1891 | Sumner | 119/17 |
| 2,601,197 | 6/1952 | Wilson | 220/19 |
| 3,399,654 | 9/1968 | Schroer | 119/96 |
| 3,470,852 | 10/1969 | Bright | 119/82 |
| 3,494,330 | 2/1970 | Santagata et al. | 119/17 |
| 3,760,768 | 9/1973 | Patterson | 119/17 |
| 3,791,347 | 2/1974 | Lovell | 119/19 |
| 3,875,902 | 4/1975 | Gasper | 119/17 |
| 4,016,833 | 4/1977 | Ray | 119/17 |
| 4,586,463 | 5/1986 | Braeuner | 119/17 |
| 5,036,795 | 8/1991 | Haughton | 119/17 |

FOREIGN PATENT DOCUMENTS

| | | | |
|---|---|---|---|
| 540613 | 11/1974 | U.S.S.R. | |
| 1289430 | 2/1987 | U.S.S.R. | 119/17 |
| 1304792 | 4/1987 | U.S.S.R. | |
| 1512167 | 5/1978 | United Kingdom | 119/17 |

OTHER PUBLICATIONS

Comus Design and Construction of Clarksburg, Maryland Product Information (5 pages).

*Primary Examiner*—John G. Weiss
*Attorney, Agent, or Firm*—Elman Wilf & Fried

[57] ABSTRACT

An enclosed cage adapted to transport and transfer animals, particularly primates, whereby the animals are transferred from the cage without any physical contact between the animal and its handler. The cage comprises a back panel slidably connected to the frame and a floor pivotally connected to the front end of the cage and rotatably connected to the base of the back panel. The floor is generally coextensive with the width and height dimensions of the interior portion of the cage. The sliding motion of the back panel causes the floor to raise from its normal horizontal position and sweep through the interior of the cage until it opposes the front opening of the cage thereby effectively forcing the monkey to exit the transport cage.

18 Claims, 6 Drawing Sheets

ANIMAL TRANSPORT-TRANSFER CAGE SYSTEM

FIELD OF THE INVENTION

This invention relates to the general field of animal husbandry and particularly to an apparatus to transport and effectively transfer research animals, particularly small primates, from one facility to another.

BACKGROUND OF THE INVENTION

Animals, such as primates, rodents, felines and canines, are used extensively in the research of afflictions and ailments, including diseases, physical disabilities and trauma, that affect the human population. The animals necessary to engage in any type of research must be transported from the animal breeder to a research facility, from research facility to research facility, and also within research areas of a particular facility. Handling the animals is a difficult task in that the animals must be treated so that the animals will not be injured during transportation and also so that the animal or human handler will not be injured transferring the animal from a transport cage to a housing cage.

Particular emphasis on handling procedures occurs when the animals being transported are infected with contagious diseases and also have an aggressive behavior. Handling primates during transportation and transfer is generally considered a high-risk procedure because of the infectious diseases they carry and also because of their aggressive behavior. Reducing or completely eliminating physical contact between the primate and the handler has increased in importance because the primates, especially those from the wild, may be infected with contagious and life-threatening diseases, such as herpes B. virus, tuberculosis, ebolla, hepatitis and HIV.

The Prior Art

The primate transport cages currently used in the transporting industry are generally made of wood. Individual monkeys are transported in separate compartments. The cages may vary in size from a single compartment to multiple compartments and capable to transport small primates, such as the rhesus, to the large adult *Macaca mulatta*. On arrival at the research center, the monkey must be transferred from the transport cage to the housing cage. A transport cage generally has a single opening at the front, permitting the animal handler to reach into the cage and grab the monkey and then physically remove the monkey from the transport cage and place it into the housing cage. The opening in the transport cage is only large enough for the handler to stick his hand and arm into the cage to grab the monkey. The opening is intentionally designed to be small to prevent the monkey from escaping through a larger opening while the handler is attempting to grab the monkey.

This type of cage is disadvantageous in requiring the handler to grab a frightened monkey, which is attempting to avoid the handler's groping hand and arm. Monkeys tend to retreat to the area of the cage farthest from the handler, making the handler's job more difficult. Such cages generally have solid side and top panels, thus preventing the handler from seeing the monkey while attempting to grab it. As a result, the monkey is often grabbed by any of its appendages, such as its arms, legs, tail or even its head, sometimes resulting in injury to the animal. Many times it takes a pair of handlers to effect the transfer—one handler to coax or prod the monkey to the front of the transport cage while the second handler is attempting to grab and secure the monkey.

After the monkey is removed from the transport cage and before it is placed in the housing cage, there exists the possibility that the monkey will escape from the handler's grasp. If this occurs, the handlers and other available personnel must stop their assigned work and proceed to capture the monkey that is loose within the housing facility. This is often a dangerous and time-consuming chore.

A decided disadvantage of existing transport cages is the necessary physical contact between the handler and the monkey during transfer. This problem has become a major concern because monkeys often carry infectious, life-threatening diseases. Even though the handlers wear protective clothing and gloves reinforced with metal studs, the monkeys, especially those with powerful canine teeth, are sometimes able to bite or scratch a handler, which may transfer an infectious disease to the handler. Recently, a veterinarian died as a result of a monkey transferring herpes B. virus to him.

Another disadvantage of the prior art is that transport cages are customarily made of wood, which cannot be properly sanitized for additional use. The importance of sanitizing the caghes is that some of the diseases earlier mentioned may be transmitted through the body fluids of the monkey. For this reason, conventional wooden transport cages are used only one time to transport an animal, and then are disposed of.

Transferring a monkey from a housing cage to a transport cage also presents a disadvantage in the treatment of the monkey. When a monkey is to be removed from some types of housing cages, a false back panel may be moved toward the front of the cage to pin the monkey against the bars of the housing cage. When the monkey is immobilized, it can be anesthetized to enable the handler to secure the monkey and place it in the transport cage. This treatment subjects the monkey to unnecessary drugs and may produce undesirable effects on the monkey.

Several types of animal carriers and housing cages have been developed to transport and house research animals. Examples of such carriers and housing cages are shown in U.S. Pat. No. 3,399,654, wherein a sliding wall of an animal cage is used to restrain an animal against the bars of the cage; U.S. Pat. No. 3,494,330, wherein a portion of the front of the cage is pivotable inwardly to constrain the animal between the pivotable portion and the interior walls of the container; and U.S. Pat. No. 3,791,347, wherein the entire floor of the carrier is slidably movable toward the bars of the cage, and the animal can be immobilized against the bars.

Comus Design and Construction, of Clarksburg, Md., distributes a variety of modular commercially available transport cages that contain from one to multiple animal compartments. The cages are made of wood and are intended to be disposed of after use. To remove the animal, the handler raises the guillotine-type door and must reach into the cage and grab the animal, therefore exposing the animal and the handler to injury and disease as earlier discussed.

SUMMARY OF THE INVENTION

It is accordingly a primary object of the present invention to provide a reuseable animal transport-transfer cage system that will overcome the difficulty of transferring a small primate to and removing a primate from a transport cage while avoiding the human/primate physical contact of the prior art stated above.

The invention avoids the aforesaid problems by completely eliminating the necessity for any physical contact between the handler and the monkey to effect evacuation of the cage. The invention incorporates an arrangement wherein a framework assembly supports a slidable or rotatable partition, such as the top, floor, back or side panels of the cage, or a combination of the partitions, that pivot and/or slide about the framework of the cage. After the door of the cage is opened or removed, the the partition slides or pivots from its normal closed position and sweeps through the interior of the cage to its open position, opposing the front opening of the cage, thereby forcing the primate from the transport cage. The position of the partition in its opened position effectively coincides with the front opening of the cage thereby evacuating the primate from the cage. To effectively accomplish this transfer operation, the partition has a length and width generally coextensive with the interior length and height dimensions of the cage so that the sweeping motion of the partition through the cage effectively eliminates all accessible space in the cage for the animal.

A preferred embodiment of the transport cage of the invention comprises an enclosed framework desirably made of metal, such as aluminum, that supports a slidably removable front panel, a slidable back panel, a floor assembly having its back end rotatably connected to the bottom of the back panel and its front end pivotally connected to the front of the framework. By enclosed, it is meant to mean a framework comprising side, top and bottom panels made of any combination of bars, screening, solid paneling or other materials capable of being used in the construction of animal cages. During animal transfer, a transition tunnel interfaces the transport cage with a housing cage. Preferably, the floor assembly of the transport cage is constructed of rungs, desirably metal rods, spaced about 1 inch apart. The floor construction allows urine and waste of the animal to pass through the floor and into a waste tray, situated directly below the floor.

The width dimension of the cage is sized so that the transport cage and removably attached transition tunnel interface with the door opening of a conventional housing cage used in the industry. This construction facilitates transferring an animal from the housing cage to the transport cage and from the transport cage to the housing cage.

The open design of the floor also facilitates cleaning and sterilizing the cage. Desirably, a waste tray is slidably removable from the cage, thereby permitting a cleaning and sterilizing solution to pass through the open floor of the cage and into the inside of the cage. The aluminum construction also allows the cage to be sterilized in an autoclave.

To transfer a primate from a preferred embodiment of the invention to a housing cage, the transition tunnel is detachably engaged to the front end of the transport cage to form a transport-transfer cage system ("cage system"). The cage system is positioned in front of the slidable access door of the housing cage so that a continuous and sealed passageway exists between the cage system and housing cage. The only path for the primate from the transport cage is through the transition tunnel and into the housing cage. The front panel of the transport cage is slidably removed, and the access door of the housing cage is opened.

To initiate the animal transfer, the handler then moves to the back of the transport cage. At this point, the monkey may intuitively move to the front of the transport cage, opposite the handler, although the monkey's movement at this point is not necessary for the invention to properly operate. The handler then lifts the back panel upwardly from its closed position, rotates the back panel horizontally and then pushes it inwardly through the cage to its opened position. This action causes the floor assembly to pivot from its normal closed, horizontal position to a vertical open position coincident with the front opening of the cage and forcing the primate through the transition tunnel and into the housing cage. If the monkey remains in the transition tunnel, the open construction of the (now vertical) floor assembly allows the handler to prod the monkey with a rod through the rungs of the floor. The construction of the floor also allows the handler to view the monkey during the transfer phase and observe the condition of the monkey.

To transfer the monkey from a conventional housing cage to the transport cage, the process is similar, except in reverse. The cage system is positioned in front of the slidable access door of the housing cage so that a continuous and sealed passageway exists between the transport cage and housing cage. The only path for the primate from the housing cage exists through the transition tunnel and into the transport cage. The front panel of the transport cage is slidably removed, and the access door of the housing cage is opened. A false back panel in the housing cage is moved inward toward the access opening, thereby forcing the monkey through the transition tunnel and into the transport cage. This process eliminates the need for drugging the animal and all animal/human contact.

One side panel of the transport cage of the present invention is desirably adapted to accommodate two containers that provide food and water to the monkey while it is in the cage. The containers pivot outwardly from the cage to allow the containers to be filled with water and food. After the containers are filled with food and water, they pivot inwardly, into the cage to allow the monkey access to the food and water. When the food and water containers are pivoted outwardly to be filled, no opening exists for the monkey to reach through and possibly grab, scratch or bite the handler. This design allows any individual to safely provide food and water to the monkeys during prolonged trips without the possibility of being grabbed, scratched or bitten by the monkey.

It is a general object of this invention to completely eliminate all physical contact between the animal handler and the animal while transferring the animal from the transport cage to the housing cage and from the housing cage to the transport cage.

It is a further object of this invention to provide means for safe transfer of the animal from the transport cage to the housing cage and from the housing cage to the transport cage.

It is a feature of the invention in that it greatly eliminates the possibility of the animal escaping during the transfer phase.

It is a further feature of the invention that the cage is made of metal, which facilitates thorough sanitization. Preferably the metal is aluminum, which is lightweight so that the cage can be easily transported from facility to facility.

It is an additional feature of the invention that its open rung construction permits easy cleaning and sterilization.

It is an advantage of this invention that there is no physical contact between the handler and animal, thereby greatly reducing the risk of exposure of the handler to contagious, life-threatening diseases carried by the animal and reducing the risk of injury to the animal.

It is a further advantage of the invention that the transfer of the animal to the housing cage is extremely efficient and requires only one handler to perform the transfer operation.

Other aspects of the invention will be apparent from the description of the preferred embodiment below and will be more specifically identified in the appended claims.

DETAILED DESCRIPTION

Figure 1:
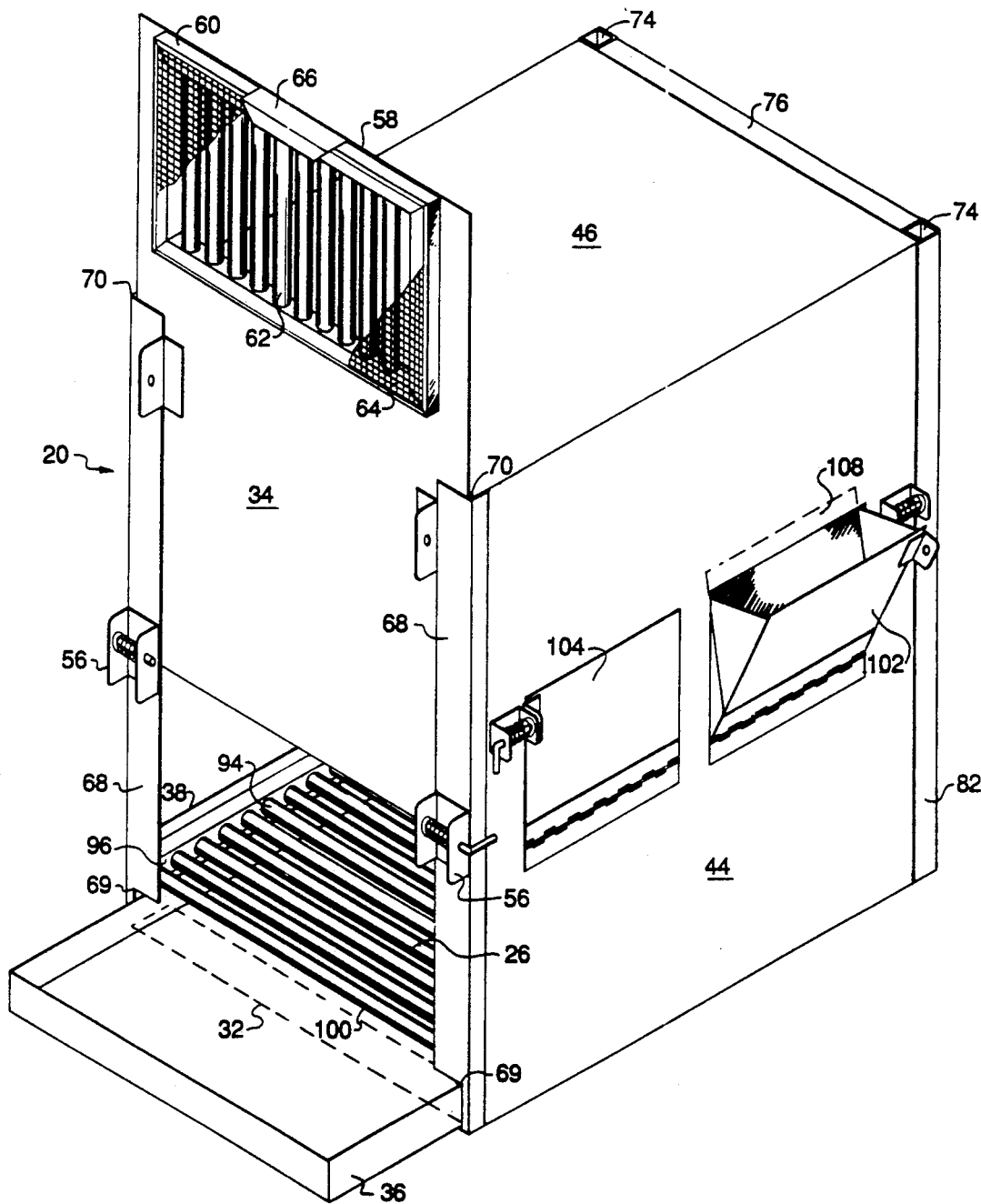
FIG. 1 is an isometric view of the transport cage of the present invention with the front panel partially removed, the waste trap partially withdrawn, the water container opened and the screening partially omitted to clearly show the rods behind the screen.
Figure 2:
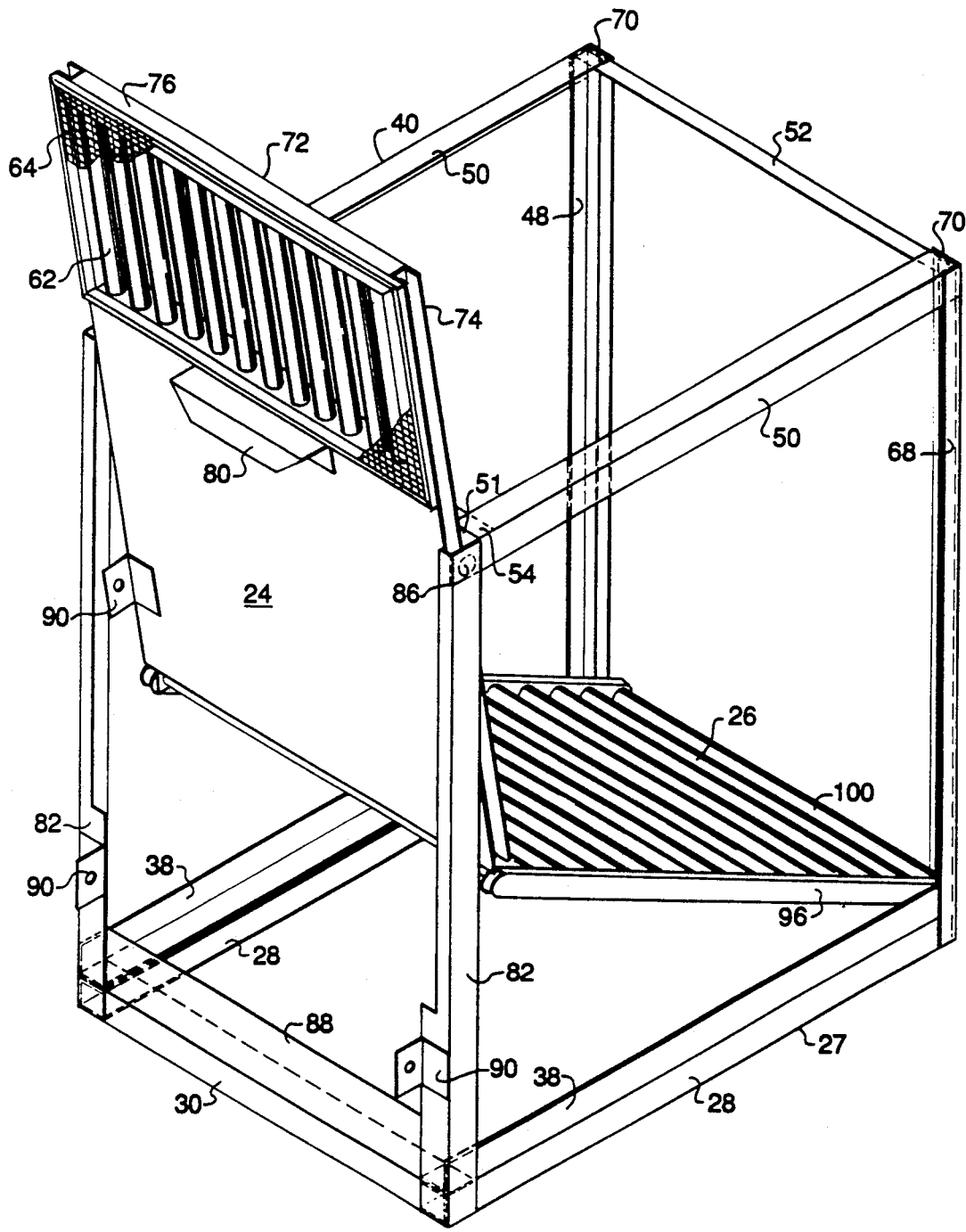
FIG. 2 is an isometric view of the transport cage of the invention with the panels removed illustrating the structural members.

FIGS. 1 and 2 illustrate the foundation of a preferred embodiment of the invention, an animal transport-transfer cage (hereinafter, "cage") 20. The design of the cage 20 may be used to transport and transfer any research animal, including, but not limited to, primates, rodents, felines or canines. The cage 20 is especially suited to effectively transfer aggressive animals, such as research monkeys from the cage 20 to a housing cage 22 and vice versa. The design of the cage 20 and its transfer action eliminates all physical contact between the animal handler and the animal, therefore preventing injury to the animal and transmission of diseases from the animal to the handler. The design of the cage is intended to meet all federal guidelines established by the Department of Agriculture and codified in 9 C.F.R., Part 3.

For illustrative purposes only, and not by limiting the application of the invention, reference to primates or Old World monkeys will be used to demonstrate the effectiveness of the cage 20. Old World monkeys, such as the cynomolgus, rhesus, African green and squirrel monkey, are used extensively in scientific research, and are known to have an aggressive behavior and are sometimes infected with life-threatening diseases as earlier discussed.

The cage 20 comprises an enclosed framework assembly that supports a slidable back panel 24 pivotally connected to a rotatable partition, such as the top, floor or a side panel of the cage, that pivots about the front of the cage. The sliding motion of the back panel 24 causes the partition to rotate from its normal closed position, sweeping through the interior of the cage, to its closed position, coincident with the front opening of the cage thereby forcing the primate to evacuate from the transport cage. In a preferred embodiment, the back panel 24 is pivotally connected to the floor assembly 26.

The cage 20 can be made from any of a variety of materials, preferably metallic, such as stainless steel or aluminum, so long as the material provides the structural integrity required of the cage 20 and can be cleaned and sanitized as required. In a preferred embodiment, the cage 20 is constructed from aluminum alloy to reduce the weight of the structure.

The size of the cage 20 depends on the size of the particular animal the cage 20 is intended to transport. The dimensions cited below are best suited for a monkey weighing no more than about 25 pounds, and are for illustrative purposes only and are not intended to limit the size of the invention. The cage 20 as illustrated weighs about 25 pounds, therefore, the weight of the cage in combination with a monkey does not exceed 50 pounds.

FIG. 2 illustrates the framework of a preferred embodiment of the cage 20. The overall size of the cage measures about 22 inches high by 15 inches wide by 21 inches deep. The base frame 27 of the cage 20 is constructed of 1½×⅛ inch channel. All channel and angle comprising the cage 20 are preferably 6063 TS aluminum. The left and right channels 28 measure about 19½ inches. The end of the channels 28 attach to the back channel 30 which is about 15¼ inches long using either angle brackets or spot welding. The channels are positioned so that the channel opening faces inwardly. A bar 32, measuring about 1½×15½×⅛ inches, spans the front of the left and right channel 28 to provide overall rigidity to the base frame. Bar 32 is offset forward of the ends of the left and right channels 28 by about ¼ inch to allow the front panel 34 to slide within framework as will be described later.

The left and right channels 28 and back channel 30 provide support for the waste tray 36. The waste tray 36 is sized to slidably fit within the channel openings of the base frame and measures about 20¼×14½×1 inches. The waste tray is constructed from 1/16 inch aluminum sheet, preferably 5052 aluminum, bent and welded or bolted as required.

Left and right base angles 38, measuring about 21×1×⅛ inches, attach to the top of the left and right channels 28 and the width of the back channel 30. Left and right base angles 38 provide a base on which the floor assembly 26 rests.

A panel frame 40 attaches to the base frame 27. The panel frame 40 comprises aluminum angle and bar attached to the left panel 42, the right panel 44 and top panel 46 to form a rigid structure. The panels are preferably 2024 T3 aluminum. The angle and bar attach to the side panels by means such as spot welding or riveting. The only requirement of the attachment means is that a smooth surface exists within the cage 20 to prevent the animal from being cut on the attachment means. Left panel 42 and right panel 44 each measure 22h×20½w×1/16 inches. Top panel 46 measures 19¾h×15w×1/16 inches. The front edge of left panel 42 and right panel 44 attach to two sets of angles. The first set, the left and right front vertical angles 48, each measuring about 19½×1×⅛ inches, provide structural integrity to the panel frame 40. The top of each vertical angle 48 has a 1 inch notch 49 to interconnect with the left and right top horizontal angles 50.

The second set of angles, the left and right front external angles 68, attach to the outside of the left and right panels 42 and 44 respectively. The left and right angles 68 each measure 1½×¾×⅛×22 inches long, and the short face of the left and right angles 68 attaches to the panels 42 and 44. The left and right panels 42 and 44 are each sandwiched between left and right angles 48 and 68 respectively. A common attachment means, preferably a rivet, joins all three elements. The bottom ends of the left and right external vertical angles 68 are positioned flush with the edge of base bar 32. This position provides a ⅛ inch gap 70 between the wide face of the angles 68 and the face of the left and right front vertical angles 48. The gap 70 provides the means that the front panel 34 slidably attaches to the cage 20 as discussed later. The bottom of the front face of the left and right external vertical angles 68 have notch 69 to allow the waste tray 36 to slidably interface with the right and left channel 28.

Spanning the left and right vertical angles 48 is a top front horizontal angle 52, measuring 13×¾×⅛ inch angle. The front edge of top panel 46 attaches to the top front horizontal angle 52.

Left and right top horizontal angles 50, measuring 20½×1×⅛ inches, interconnect with the notches 49. The top of left panel 42 and right panel 44 and the sides of top panel 46 attach to the left and right top horizontal angles 50. The back end of the left and right top horizontal angles 50 each have a ¾ inch notch 51. The notch allows for the sliding action of the back panel 24 as discussed later. Spanning the left and right top horizontal angles 50 is a bar 54 measuring 1½×13×⅛ inches to provide additional support for the top panel 46. The back edge of top panel 46 attaches to bar 54.

The back edge of the left panel 42 and right panel 44 attach only to a left and right back external angles 82. The left and right back external angles 82 measure 22×1×⅛ and are notched as shown to allow for the motion of the back panel 24, discussed later.

Left panel 42 or right panel 44 may be provided with openings which are adapted to be aligned with the water 102 and feeder 104 containers. The containers are pivotally attached to the panel to allow the containers to rotate from a closed to open position and filled external of the cage. Each container contains a stop lip 108 that prevents the containers from pivoting outwardly to a point where the monkey could reach through gaps between the containers and the panel. The containers may be held in the closed position using spring-loaded latches, or alternatively, the containers may be held in the closed position using key-locked latches.

The assembled panel frame 40 is positioned over the base frame 27 so that the bottom of the left panel 42 and right panel 44 are flush with the bottom of the left and right channels 28 respectively. The panel frame 40 attaches to the base frame 27 where the left and right panels 42, 44 and left and right channels 28 intersect.

The front of the cage 20 comprises a front panel 34. The front panel 34 slidably interfaces with the cage 20 by means of gap 70 and locks into place by means of spring-loaded latches 56. Alternatively, the spring-loaded latches 56 may be replaced by key-lock latches to provide additional security so that the animal will not be released by unauthorized personnel. The front panel 34 is removed from the cage by unlocking the latches and sliding the front panel 34 in an upward motion.

The front panel 34 measures about 22h×15w×1/16 inches. A cutout 58 is centrally located about ¾ inch from the top of the front panel 34 and measures about 10¾×6 inches. The cutout 58 in the front panel 34 in combination with the back panel cutout 72 in the back panel 24 provides the necessary air flow for the animal. A frame 60 comprising ⅜ inch aluminum rod 62 and stainless steel screening 64 over the frame 60 is placed over the cutout 58. The rods 62 are preferably placed at 1 inch centers to reduce the amount of space the animal has to put any part of its body through. Stainless steel screening 64 is preferred because it is more durable and less susceptible to ripping.

The frame 60 is positioned so that its top is flush with the top of the front panel 34. A pull handle 66 attaches to the top of the frame 60 to allow the handler to pull the front panel 34 upwardly to remove it from the cage 20. The handle 66 extends outwardly from the face of the frame 60 by at least one inch. This allows a gap between the cage 20 and another cage or other objects to allow air flow into the cage.

A spring-loaded latch 56, or alternatively, key-locked latches, may be mounted on the front face of the left and right external vertical angle 68. The corresponding latch is accordingly positioned on the front face of the front panel 34.

Figure 3:
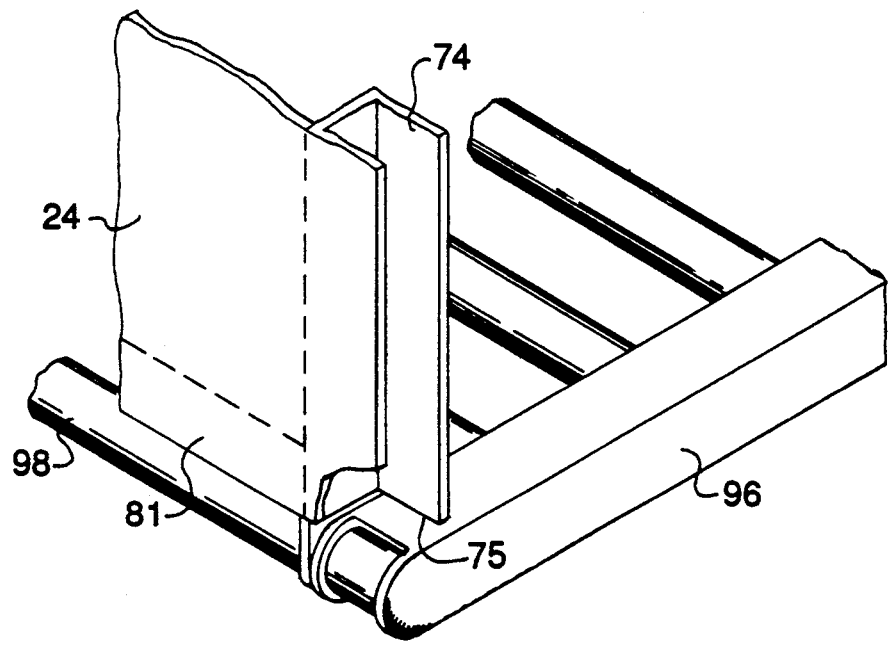
FIG. 3 is an enlarged view of a portion of the back panel and floor assembly illustrating the rotatable connection.

The back panel 24 measures about 19 9/16h×14½w×1/16 inches. A cutout 72 is centrally located about ¾ inch from the top of the back panel 24 and measures about 13×6 inches. Left and right vertical channels 74, measuring about 20¾×¾×⅛ inches, are attached on the inside face of the back panel 24, flush with each edge of the back panel 24 and with the channel opening facing outwardly. The bottom of the left and right vertical channels 74 is notched 75 as shown in FIG. 3 to allow the interface with the floor as discussed later. Top and bottom horizontal channels 76, measuring about 13×¾×⅛ inches, are interposed between the left and right vertical channel 74 flush with the edges of the cutout 72. The top and bottom horizontal channels 76 support ⅜ inch aluminum rod 62, spaced approximately on one inch centers. A frame 78 comprising stainless steel screening 64 is attached to the front face of the back panel 24 over cutout 72.

A handle 80 attaches to the front face of the back panel 24 below the screen frame 78. The handle 80 allows the handler to perform the transfer operation of the invention described later. The handle 80 extends outwardly from the face of the back panel 24 by at least one inch to provide a gap between the cage 20 and another cage or other object to allow air flow into the cage.

Figure 6:
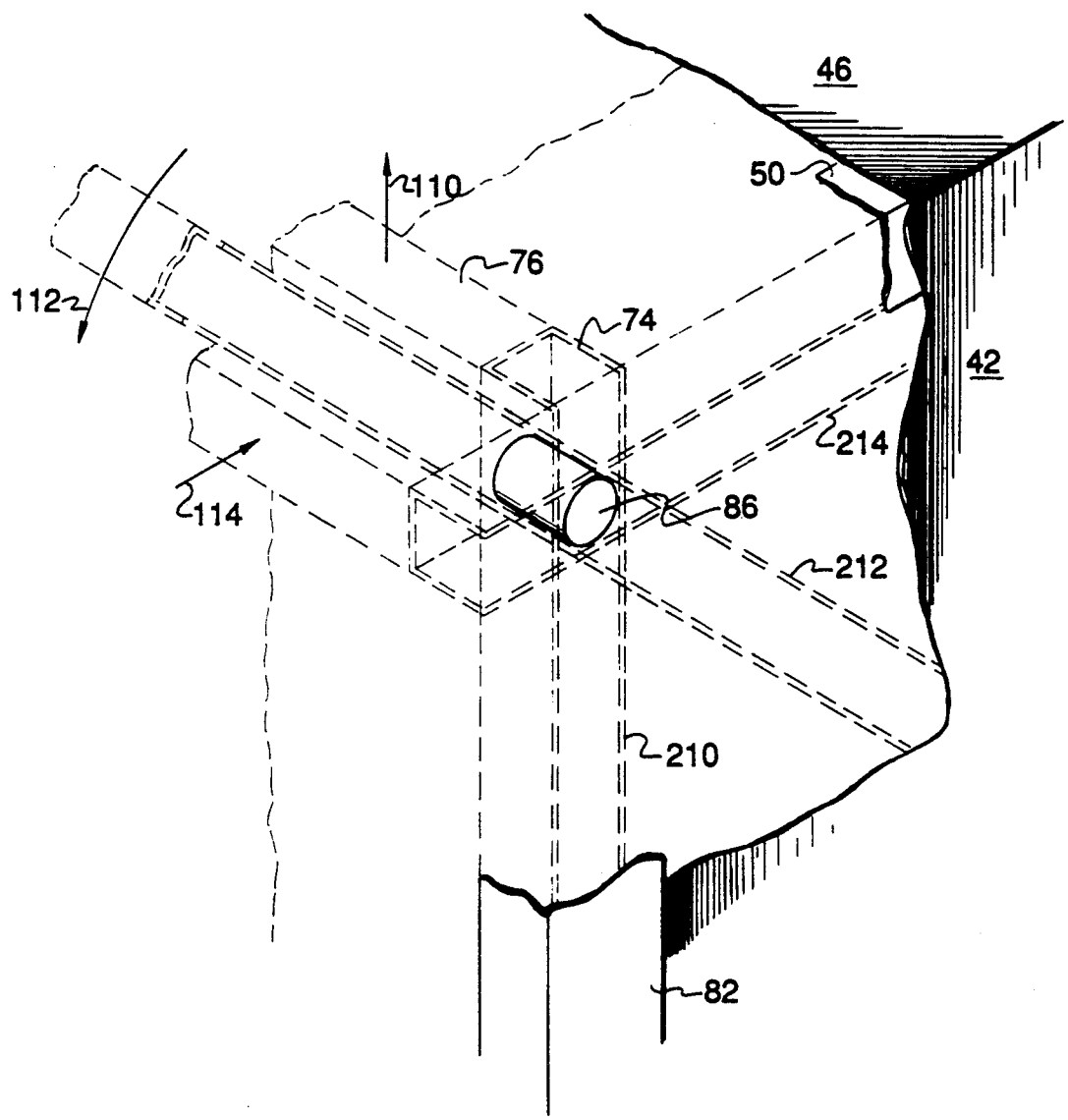
FIG. 6 is an enlarged view of the connection point between the back panel and guide stud during the transfer motion.

A left guide stud 86 is attached to the back end of left top horizontal angle 50 as shown in FIGS. 2 and 6. The guide stud 86 is a 7/16 inch rod, about 11/16 inch long. It can be welded in place or can be attached with a screw through the left back external angle 82, the left panel 42 and the left top horizontal angle 50. A right guide stud 84 is similarly attached on the right side of the cage 20. The opening of the left and right vertical channels 74 interface with the left guide stud 86 and right guide stud 84 respectively. The back panel 24 occupies the space left open by the notch 51 in each of the left and right top horizontal angle 50 as shown in FIG. 2.

A back panel support angle 81 attaches to the bottom of the inside face of the back panel 24 in between the left and right vertical channel 74. The support angle 81 gives additional structural support to the back panel 24.

At the base of the back panel 24 and attached to the back channel 30 is an exterior bar 88, measuring about $13\frac{7}{8} \times 2 \times 1/16$ inches to cover the opening between the bottom of the back panel 24 and the back channel 30.

Two pair of L-brackets 90, each with a $\frac{1}{4}$ inch hole are attached to the left and right external angle 82 and to the back panel 24 as shown in FIG. 2 so that the holes are aligned along a common horizontal axis. An L-shaped, $\frac{1}{4}$ inch locking rod 92 (not shown), about 15 inches long, communicates with the holes along a common axis to lock the back panel 24 in its closed position. A clevis pin is used to fix the locking rod 92 in place and prevent the locking rod 82 from slipping past the holes. Alternatively, the L-brackets 90 may be replaced with key-locked latches.

Rotatably attached to the bottom of the back panel 24 is the floor assembly 26 as shown in FIGS. 2 and 3. The floor comprises $\frac{3}{8}$ inch aluminum rod 94, interposed between left and right floor channels 96 on about 1 inch centers. The channel 96 measures about $20\frac{1}{2}$ long $\times \frac{1}{2} \times \frac{1}{2}$ and are spaced about $13\frac{1}{4}$ inches apart. The rods 94 are sized to span the left and right channel 96. The floor assembly 26 is sized so that its length and width dimensions are generally coextensive with the interior length and height dimensions of the cage 20 so that the sweeping motion of the floor assembly 26, discussed later, through the cage 20 effectively eliminates accessible space in the cage for the animal.

The back end of the floor assembly 26 rotatably attaches to the bottom of the back panel 24. The back end of the floor channel 96 interfaces with the notches 75 of the left and right vertical channels 74. The end rod 98 of the floor assembly 26 slidably couples the end of the floor channel 96 and the left and right vertical channels 74.

Figure 4:
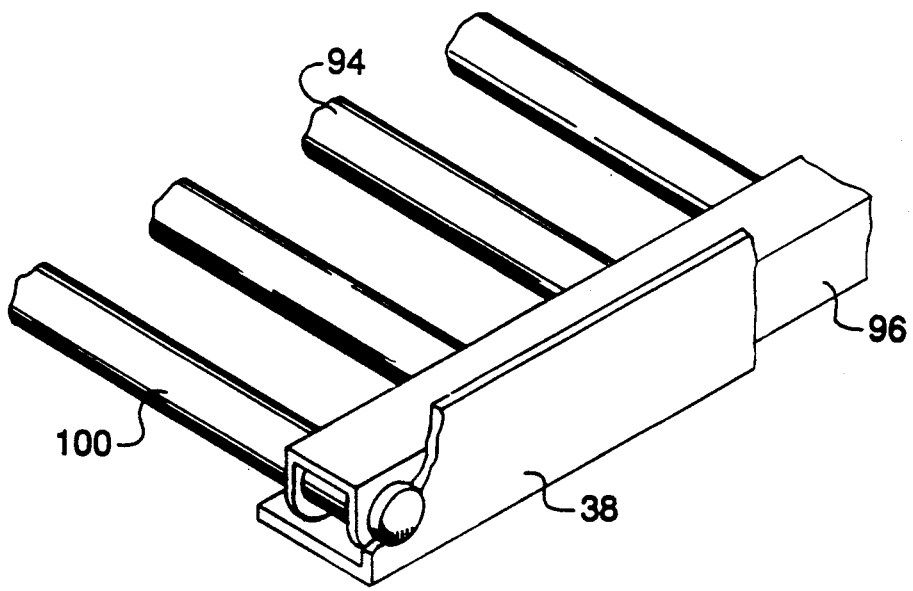
FIG. 4 is an enlarged view of a portion of the floor assembly illustrating the interface with the frame.

The floor assembly 26 pivots about the front end of the cage as shown in FIGS. 2 and 4. To facilitate this action, the front end of the left and right floor channel 96 are rounded. The front rod 100 extends through the left and right floor channel 96 and through the left and right base angle 38 and the left and right panels 42 and 44 respectively.

Figure 5:
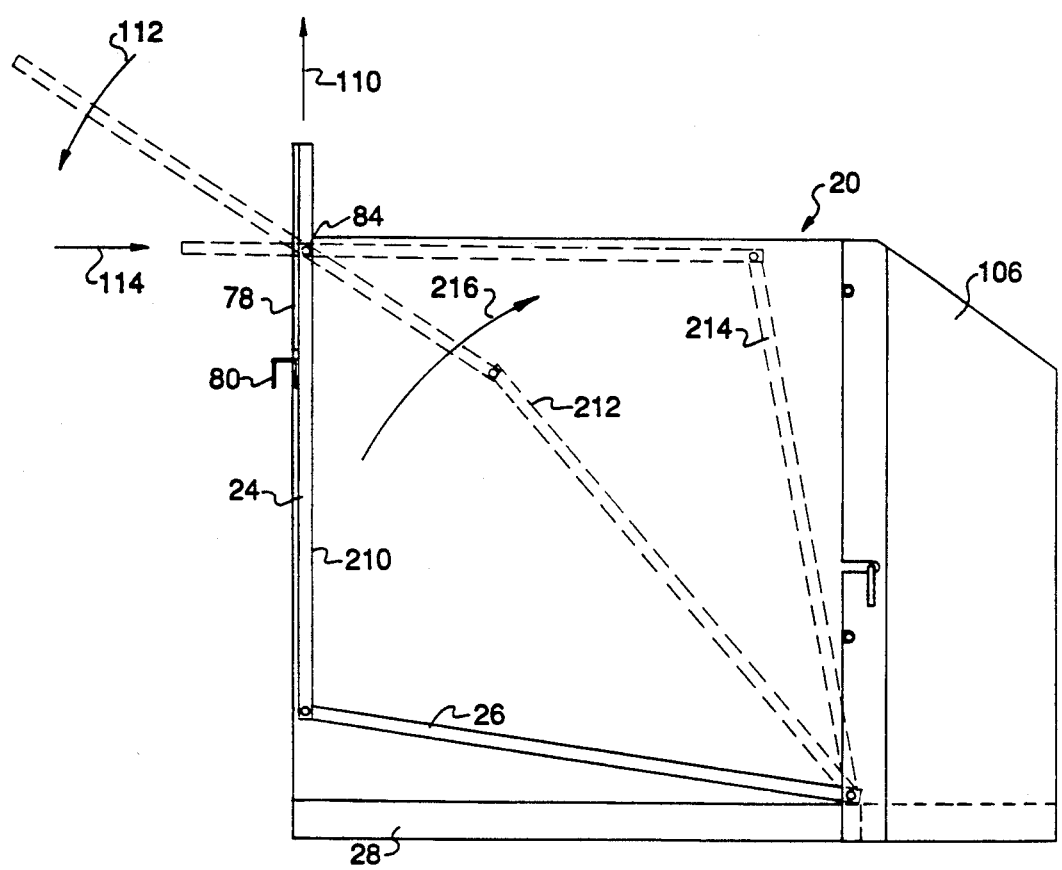
FIG. 5 is an elevation cut-away view of the invention illustrating the relative motion between the back panel and floor assembly during the transfer motion.
Figure 7:
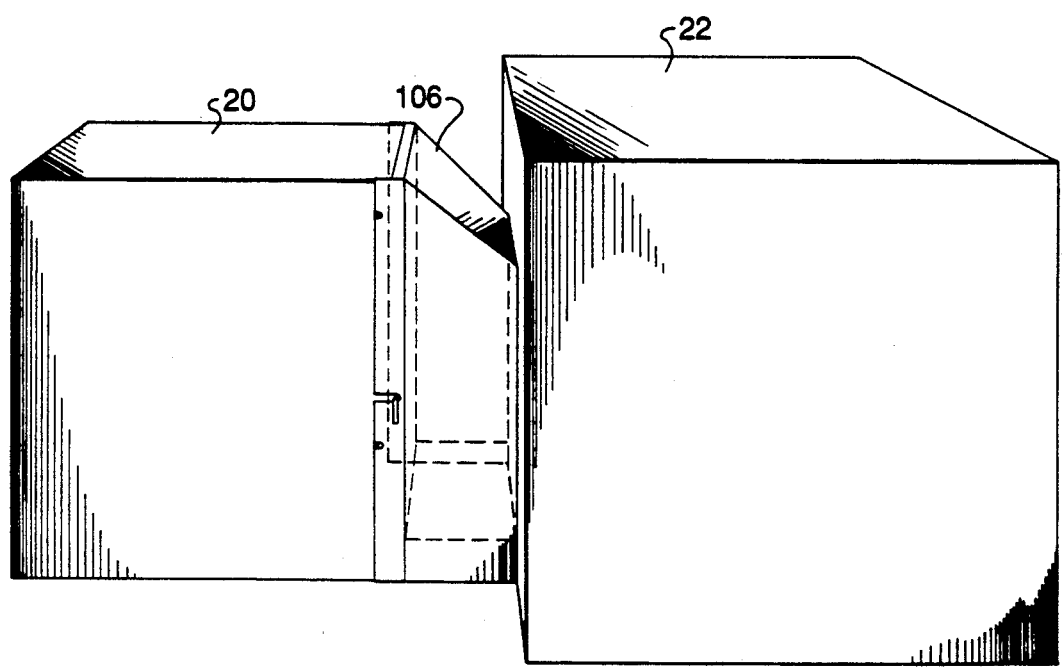
FIG. 7 is an elevation view of the invention interfacing with a housing cage, the transport cage and housing cage shown generically and without detail to highlight the position of the transition tunnel.

The operation to transfer the monkey from the cage 20 to the housing cage 22 is shown in FIGS. 5, 6 and 7. A transition tunnel 106 detachably attaches to the front of the cage 20 using any convenient attachment means such as spring release or tension latches. The transition tunnel 106 provides a sealed passageway for the monkey between the cage 20 and housing cage 22. The transition tunnel 106 is preferably made from aluminum and is shaped to fit within the opening of the housing cage 22.

After the cage 20 and transition tunnel 106 are securely positioned in front of the access door of the housing cage 22 the handler removes the front panel 26 after releasing the front latches 56 and opens the access door of the housing cage. The handler then proceeds to the back of the cage for the transfer operation. The handler begins by grasping the back handle 80 and sliding the back panel from its closed position upward shown by arrow 110 in a vertical direction to a point where the movement of the floor assembly 26 prevents the back panel 24 from continuing to slide upward. The floo assembly 26 begins to travel from its closed position; its back end rising with the back panel 24 and its front end pivoting about the front rod 100. The geometry of the floor assembly 26 and its movement prevent the back panel 24 from continuing to slide upward. At this point, the handler rotates the back panel 24 in the direction of arrow 112 from its vertical position to a horizontal position causing the back end of the floor assembly to elevate from position 210 to 212 toward top panel 46 in the direction of arrow 216 and effectively reduce the amount of space in the cage 20 accessible to the monkey. The monkey is further persuaded to exit the cage 20 in favor of the housing cage 22 when the handler completes the transfer motion by sliding the back panel 24 in the direction of arrow 114 and causing the floor assembly 26 to rotate from position 212 to 214 and then generally coincident with the front opening of the cage 20. Since the length dimension of the floor assembly is equal to the height dimension of the cage 20, there is no area for the monkey to escape other than through the transition tunnel into the housing cage 22.

Modifications and changes from the specific form of the invention herein shown and described as a preferred embodiment will occur to those skilled in the art. All such modifications and changes not departing from the spirit of the invention are intended to be embraced within the scope of the appended claims.

Having thus described the invention, what is desired to protect by Letters Patent and hereby claim is:

1. A reuseable animal transport-transfer cage comprising:
    a) an enclosed framework assembly having an open front end and an open back end,
    b) a front panel removeably attached to the open front end of the framework assembly,
    c) a back panel having a closed position coincident with the open back end and a means for slidably moving about a fixed point of the framework assembly to an opened position,
    d) a moveable partition generally coextensive with the height and width dimensions of the enclosed framework having a first normal position and a second position and a first end rotatably connected to the back panel and a second end pivotally connected to the open front end of the framework assembly,
whereby the sliding movement of the back panel from the closed to opened position causes the partition to sweep through the framework assembly from its first normal position to its second position generally coincident with the open front end of the framework assembly sufficiently to evacuate an animal from the cage.

2. The animal transport-transfer cage of claim 1 wherein the moveable partition is a floor assembly.

3. The animal transport-transfer cage of claim 2 wherein the floor assembly comprises a frame and a plurality of rungs extending across the frame.

4. The animal transport-transfer cage of claim 1 wherein the front panel slidably attaches to the open front end and has an aperture therein and further comprises a screen and a plurality of rods extending across the aperture.

5. The animal transport-transfer cage of claim 1 wherein the back panel has an aperture therein and further comprises a screen and a plurality of rods extending across the aperture.

6. The animal transport-transfer cage of claim 1, wherein said framework assembly has a bottom end, and further comprising a waste tray slidably removable from the bottom end of the framework assembly.

7. The animal transport-transfer cage of claim 1 further comprising a side partition having an aperture therein and further comprises a food/water container pivotally connected to the side panel having a closed position wherein the aperture is closed and an opened position wherein the food/water container may be refilled.

8. The animal transport-transfer cage of claim 1 wherein the cage is constructed of aluminum.

9. A reuseable animal transport-transfer cage comprising:
   a) an enclosed framework assembly having an open front end, and an open back end,
   b) a front panel lockably attached to the open front end of the framework assembly,
   c) a back panel having a lockable closed position coincident with the open back end and a means for slidably moving about a fixed point of the framework assembly to an opened position,
   d) a moveable floor assembly generally coextensive with the height and width dimensions of the enclosed framework, wherein the floor assembly has a first normal position and a second position and a first end rotatably connected to the back panel and a second end pivotally connected to the front end of the framework assembly, whereby the sliding movement of the back panel from the closed to opened position causes the partition to sweep through the framework assembly from its first normal position to its second position generally coincident with the open front end of the framework assembly sufficiently to evacuate an animal from the cage.

10. The animal transport-transfer cage of claim 9 wherein the floor assembly comprises a frame and a plurality of rungs extending across the frame.

11. The animal transport-transfer cage of claim 9 wherein the front panel slidably attaches to the open front end and has an aperture therein and further comprises a screen and a plurality of rods extending across the aperture.

12. The animal transport-transfer cage of claim 9 wherein the back panel has an aperture therein and further comprises a screen and a plurality of rods extending across the aperture.

13. The animal transport-transfer cage of claim 9, wherein said framework assembly has a bottom end, and further comprising a waste tray slidably removable from the bottom end of the framework assembly.

14. The animal transport-transfer cage of claim 9 further comprising a side partition having an aperture therein and further comprises a food/water container pivotally connected to the side panel having a lockable closed position wherein the aperature is closed and an opened position wherein the food/water container may be refilled.

15. The animal transport-transfer cage of claim 9 wherein the cage is constructed of aluminum.

16. The animal transport-transfer cage of claim 9 further comprising a transition tunnel removably attached to the framework assembly.

17. A reuseable animal transport-transfer cage system comprising:
   a) an enclosed framework assembly having a bottom end, an open front end, an open back end, a first and second side partition and a top partition;
   b) a front panel slidably removeably attached to the open front end of the framework assembly and having an aperture and a screen and a plurality of rods extending across the aperture;
   c) a back panel having a closed position coincident with the open back end and a means for slidably moving about a fixed point of the framework assembly to an opened position and also having an aperture and a screen and a plurality of rods extending across the aperture;
   d) a moveable floor assembly generally coextensive with the height and width dimensions of the enclosed framework, wherein the floor assembly comprises a frame and a plurality of rungs extending across the frame and having a first normal position and a second position and a first end rotatably connected to the back panel and a second end pivotally connected to the front end of the framework assembly,
   d) a waste tray slidably removable from the bottom end of the framework assembly;
   e) the side partition having an aperture therein and further comprises a food/water container pivotally connected to the side panel having a closed position wherein the aperture is closed and an opened position wherein the food/water container may be refilled; and
   f) a transition tunnel removably attached to the framework assembly;

whereby the sliding movement of the back panel from the closed to opened position causes the partition to sweep through the framework assembly from its first normal position to its second position generally coincident with the open front end of the framework assembly sufficiently to evacuate an animal from the cage.

18. A method of transferring an animal from a reuseable animal transport-transfer cage system of claim 17 comprising:
   a) attaching the transition tunnel to the front of the framework assembly;
   b) positioning the animal transport-transfer cage system in alignment with the access door of a housing cage whereby the transition tunnel provides a sealed passageway between the cage system and the access door of the housing cage;
   c) removing the front panel;
   d) opening the access door of the housing cage;
   e) sliding the back panel from its closed position upward in a vertical direction;
   f) rotating the back panel to a horizontal position; and
   g) sliding the back panel into the cage system into its opened position;

whereby the steps E, F and G cause the back end of the floor assembly to elevate from its normal position towards the top of the framework assembly to its second position, generally coincident with the open front end of the framework assembly sufficiently to evacuate an animal from the cage through the transition tunnel and into the housing cage.

* * * * *